United States Patent Office 3,165,513
Patented Jan. 12, 1965

3,165,513
TRIAZINE PHOSPHONIUM DERIVATIVES
Gaetano F. D'Alelio, South Bend, Ind., assignor, by direct and mesne assignments, to Dal Mon Research Co., Cleveland, Ohio, a corporation of Delaware
No Drawing. Filed Dec. 26, 1961, Ser. No. 162,205
15 Claims. (Cl. 260—248)

This invention relates to derivatives of symmetrical triazine. More particularly it relates to symmetrical triazine derivatives having 1 to 3 phosphonium radicals attached to the carbon atoms of each triazine nucleus, which phosphonium radical has at least one hydrocarbon group therein having ethylenic unsaturation.

While applicant's copending application, Serial No. 764,252 filed September 30, 1958, now Patent No. 3,062,775 discloses and claims polymerization products from such triazine phosphonium derivatives, the compounds of this invention are suited to various other compositions and uses. For example, they can be used as chemical intermediates, e.g. by addition of halogen to the ethylenic group to give very effective gasoline anti-knock agents and lead scavengers, etc., to produce condensation polymers, particularly condensation polymers having unsaturation therein available for subsequent curing or further polymerization and crosslinking, and can be used as crosslinking agents for addition polymers, inhibitors, rust preventatives, detergents, gasoline anti-knock agents, gasoline lead scavengers, sulfurizing agents, insecticides, herbicides, electroplating solution additives, fire retardants, tanning agents, etc.

The compounds of this invention are derivatives of 1,3,5 triazines,

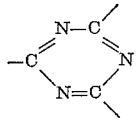

sometimes represented herein as "$C_3N_3$," to which is attached, through the carbon atoms of the triazine ring, at least one phosphonium moiety,

directly to the phosphorus atom,

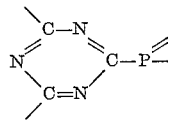

Since the triazinyl radical is trivalent, these derivatives may contain no more than three phosphonium groups,

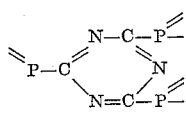

The only requirement for the compounds of this invention is that they contain at least one such phosphonium group, and thus, though the other valencies of the triazine ring may be occupied by any monovalent radical, certain advantages accrue when more than one phosphonium group is present, or when the other monovalent radicals are especially selected to perform a special or selected function. Thus triazine dervatives have the formula

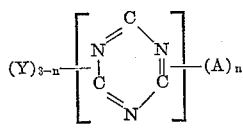

in which $n$ represents a numerical value of 1 to 3, A represents a radical selected from the class of

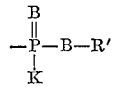

wherein B is selected from the class of oxygen and sulfur, R' represents an unsaturated hydrocarbon radical containing from two to twenty carbon atoms and halogenated derivatives of said hydrocarbon radicals, K represents a radical selected from the class of —BR, —BM, and —NR$_2$, in which M represents an alkali metal or an alkaline earth metal, and Y represents a monovalent radical.

For ordinary purposes the nature of the monovalent radical Y is not critical, and is preferably selected from the class of H, —R, —BH, —BR, —NR, —NRNR$_2$, halogen, and the hydroxy-, halogeno-, acetoxy, alkoxy, carbamido and sulfamido derivatives of the R group, in which R is a hydrocarbon radical containing one to twenty carbon atoms including R', such as HO—, HS—, H$_2$N—, CH$_3$O—, C$_2$H$_5$O—, H$_2$NO$_2$SC$_6$H$_4$NH—,

H$_2$NOCC$_6$H$_4$O—

CH$_3$—, C$_2$H$_5$—, C$_4$H$_9$—, CH$_3$NH—, (CH$_3$)$_2$N—, C$_2$H$_5$NH—, CH$_2$=CHCH$_2$NH—, (C$_2$H$_5$)$_2$N—,

HOCH$_2$NH—

HOCH$_2$CH$_2$NH—, H$_2$NOCCH$_2$S—, H$_5$C$_2$OOCCH$_2$NH—, NCCH$_2$CH$_2$S—, H$_2$NCONH—, H$_2$NONHNH—,

Cl—, Br—, I—, CH$_3$COOCH$_2$CH$_2$NH—, etc.

When it is desirable to impart special properties to the triazinyl phosphonium derivatives used in the practice of this invention, such as good solubility in petroleum products, then R advantageously represents a hydrocarbon radical possessing from 5 to 20 carbon atoms. When it is desired to impart further special properties to these compounds, such as antioxidant properties, while still retaining solubility in hydrocarbons, or to have these compounds act as stable halogen carriers, and taking into account present economic factors and availability of raw materials, preferentially Y represents a radical selected from the group consisting of R"—, R"B—, R"$_2$N—, wherein R" represents radicals containing 5 to 20 carbon atoms selected from the class of R, halogenated derivatives of R and hydroxyaryl radicals, such as C$_6$H$_5$—, C$_6$H$_5$O—, CH$_3$C$_6$H$_4$O—, (CH$_3$)$_2$C$_6$H$_3$O—, ClC$_6$H$_4$O—,

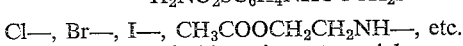

$C_{12}H_{25}$—

HOC$_6$H$_4$—, HOC$_6$H$_4$NH—, C$_5$H$_{11}$NH—, (C$_5$H$_{11}$)$_2$N—, C$_{10}$H$_{21}$NH—, C$_{18}$H$_{37}$NH—, C$_5$H$_{11}$O—, C$_8$H$_{17}$O—,

C$_5$H$_{11}$S—

C$_8$H$_{17}$S—, etc.

The hydrocarbon group represented by R is saturated or unsaturated, straight and branched chain aliphatic hydrocarbon radicals, aryl radicals, alkylaryl radicals, aralkyl radicals, saturated and unsaturated alicyclic radicals, and the like. The halogenated hydrocarbon derivatives are the fluoro, chloro, bromo, and iodo derivatives. For economic reasons, the chloro and bromo derivatives are preferred.

The alkaline and alkaline earth metals represented by M are either monovalent or polyvalent, for example, potassium, sodium, lithium, barium, calcium, cesium, magnesium, strontium, etc.

Further versatility is demonstrated in these compounds by the nature and number of the phosphonium groups attached to the triazine ring. When a high concentration of phosphorus is desired in the addition, then three such groups are attached to the nucleus, and if the lowest concentration of carbon is desired in this compound then the vinyl ester derivative,

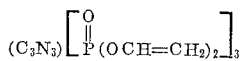

is used, whereas if a high carbon content is desired, the higher unsaturated alcohol esters are satisfactory, thus

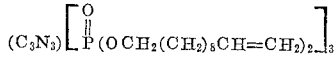

Further, if a detergent property is required, the triazinyl phosphonium ester may be saponified to produce soluble or dispersible salts, thus

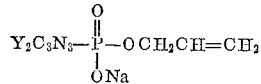

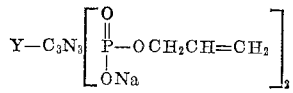

Or if a non-ion type detergent addition is desired, the phosphinic acid may be reacted with an alkylene-oxide to obtain such a product, thus

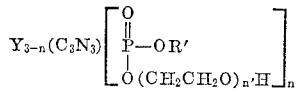

wherein $n'$ has a numerical value of 3 to 13.

The phosphonium moiety may also act as a carrier of halogen atoms, thus

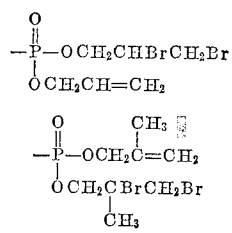

or as a carrier of an antioxidant structure, thus

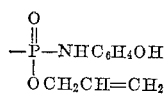

or in a joint function, such as

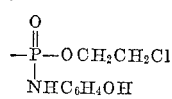

The compounds used in the practice of this invention are prepared readily by the reaction of a halo-s-triazine with a suitable phosphite ester, for example, $$Cl_3C_3N_3 + 3P(OR')_3 \rightarrow C_3N_3[PO(OR')_2]_3$$
$$YC_3N_3Cl_2 + 2P(OR')_3 \rightarrow Y—C_3N_3[PO(OR')_2]_2$$
$$Y_2C_3N_3Cl + P(OR')_3 \rightarrow Y_2C_3N_3—PO(OR')_2$$

EXAMPLE I

To a reaction flask, equipped with stirrer, heater, and thermometer, 202 parts of triallyl phosphite and a small amount of copper acetate are first added, followed by the gradual addition of 61 parts of cyanuric chloride. After the addition of the cyanuric chloride is completed, the mixture is heated at 80–110° C. for 1 hour, or until the evolution of allyl chloride is completed, and there is obtained substantially a quantitative yield of symmetrical triazine triphosphonic hexallyl ester having the formula

The compound is washed with water and then dried under reduced pressure and recrystallized from heptane-acetone mixtures. Ultimate analyses for carbon, hydrogen, nitrogen, phosphorus, and molecular weight determinations give values of 44.8%, 5.29%, 7.3%, 16.62%, and 560 respectively, all of which values are in close agreement with the theoretical values.

When this compound is converted by addition of chlorine to the double bonds of the allyl groups, a derivative is obtained which is a very effective additive and lead scavenger for gasolines containing tetraethyl or tetramethyl lead.

EXAMPLE II

Example I is repeated using a molar equivalent amount of trimethylallyl phosphite instead of triallyl phosphite and there is obtained

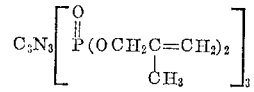

which on analysis shows values of C and H which are in good agreement with the calculated values for carbon and hydrogen.

EXAMPLE III

Example I is repeated, using molar equivalents of tri-n-butenyl phosphite instead of triallyl phosphite, and there is obtained

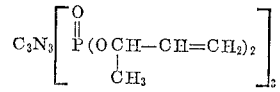

in substantially quantitative yield.

EXAMPLE IV

Example I is repeated using molar equivalents of trivinyl phosphite instead of triallyl phosphite and there is obtained

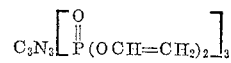

which on analysis showed values for C and H, which are in good agreement with the theoretical values.

EXAMPLE V

Example I is repeated using molar equivalents of triallyl thiophosphite instead of triallyl phosphite, there is obtained

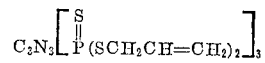

which on analysis and molecular weight determination give values in close agreement with the theoretical values for this compound. When the trimethylallyl thiophosphite is used in equivalent amounts instead of the triallyl thiophosphite, there is obtained

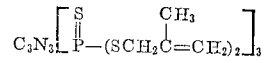

EXAMPLE VI

One hundred fifty (150) parts of

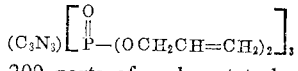

are added to 200 parts of carbon tetrabromide and 80 parts of bromine added to the mixture at 20–50° C. there is obtained in solution in ethylene dibromide, the compound

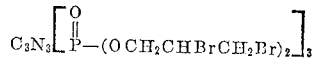

This solution can be used as such as a gasoline additive, or, the halogenated phosphonium triazine derivative can first be isolated by removal of the carbon tetrabromide under reduced pressure. When the methallyl derivative is used instead of the allyl derivative, there is obtained

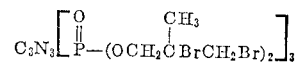

EXAMPLE VII

In a suitable reactor equipped with stirrer and reflux condenser a mixture of 145.5 parts of 2,4-diamino-6-monochloro-1,3,5 triazine, 200 parts of triallyl phosphite and 200 parts of benzene are refluxed for eight hours, or until no more allyl chloride is released. The reaction is cooled and

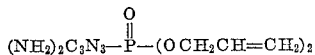

is separated by filtration, washed with alcohol and dried, which, on analysis, gives the following values: 40% carbon, 25.8% nitrogen, 5.2% hydrogen, and 11.4% phosphorus. These values are in close agreement with the theoretical values. When 165 parts of the corresponding monoamino-dichloro-triazine are reacted instead of the monoaminochlorotriazine with 380 parts of triethyl phosphite, an almost quantitative yield of

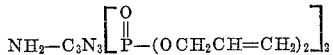

is obtained. On analysis this gives values of 45.3% carbon, 5.2% hydrogen, 13.3% nitrogen, and 14.6% phosphorus, which values are in close agreement with theoretical values.

When this diester is allowed to stand at room temperature with aniline, the corresponding

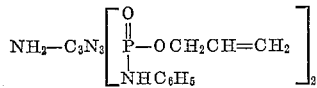

is obtained.

When the above compounds are reacted with formaldehyde, condensation products are obtained which are suitable for coating compositions and are found to be capable, because of the ethylenic unsaturation therein, of drying to hard finishes when spread in film form from compositions in which paint driers are also present.

EXAMPLE VIII

The procedure of Example I is repeated, using tri-(alpha-chloroallyl)-phosphite in molar quantities equivalent to triethylphosphite, and there is isolated the compound $$C_3N_3\left[\overset{O}{\underset{\|}{P}}(OCH_2\overset{Cl}{\underset{|}{C}}=CH_2)_2\right]_3$$

EXAMPLE IX

One hundred forty-seven (147) parts of 2-chloro-4,6-dihydroxy-s-triazine prepared from cyanuric chloride by the method given in J. prakt. Chem., (2), 75, 103 (1907) are reacted with 75 parts of triallyl phosphite according to the procedure of Example I, and a very high yield of

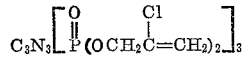

is obtained, whereas when an equivalent weight 2,4-dichloro-6-hydroxy-s-triazine is used instead of the 2-chloro-4,4-dihydroxy compound, the corresponding derivative $$HO-C_3N_3\left[\overset{O}{\underset{\|}{P}}-(OCH_2CH=CH_2)_2\right]_2$$

is obtained in excellent yield.

When

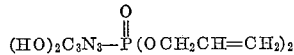

is treated with aniline, methyl amine and diethyl amine respectively according to the procedure of Example VII, the corresponding amides are obtained respectively,

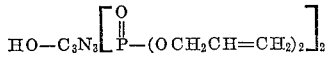

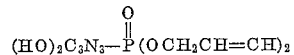

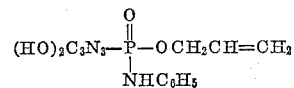

EXAMPLE X

Two hundred thirty-six (236) parts of $$HOC_6H_4NH-C_3N_3Cl_2$$

prepared according to the procedure of U.S. Patent 2,393,755 in 250 parts of benzene are refluxed ten hours with 195 parts of tri-allyl phosphite for six hours, after which the benzene is removed under a reduced pressure, using a water aspirator to give a quantitative yield of crude but relatively pure $$HOC_6H_4NH-C_3N_3\left[\overset{O}{\underset{\|}{P}}(OCH_2CH=CH_2)_2\right]_2$$

When an equivalent amount of $(HOC_6H_4NH)_2C_3N_3Cl$ (see U.S. Patent 2,393,755) is used instead of the dichloro-triazine of this example, there is obtained

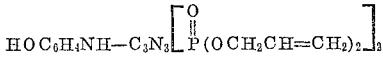

Treatment of these phosphonic esters with the amines of Example IX by the procedure of Example VII produces the corresponding phosphonamides, whereas when diethyl amine or decyl amine is used, there is obtained respectively

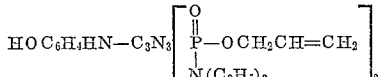

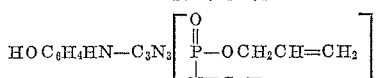

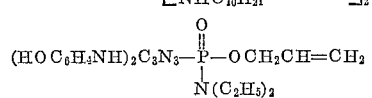

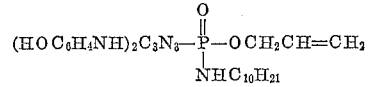

EXAMPLE XI

3-Amino-4,6-dichloro-s-triazine prepared according to the method of Berichte, 32, 691 (1889), is converted to 2-amino-4-hydroxy-6-chloro-s-triazine by the hydrolysis procedure of J. prakt. Chem., (2), 75, 103 (1907). Thereafter, 136 parts of 2-amino-4-hydroxy-6-chloro-s-triazine are reacted with 240 parts of trimethallyl phosphite according to the procedure of Example I, and there is obtained

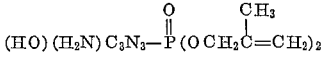

The use of an equivalent amount of triallyl phosphite gives the corresponding derivative having allyl instead of methallyl radicals.

EXAMPLE XII

One hundred thirty-eight (138) parts of 2-amino-4,6-dichloro-s-triazine are mixed with 240 parts of triallyl phosphite and allowed to react in a suitable container at room temperature for twenty-four hours, and at 60° C. for 8 hours; there is obtained on recrystallization of the reaction product from acetone-water a substantial yield of

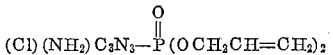

EXAMPLE XIII

Two hundred and fifteen (215) parts of 2-phenyl-4,6-dichloro-s-triazine prepared by the procedure of U.S. Patent 1,911,689 is reacted by the procedure of Example II with 260 parts of triallyl phosphite, and there is obtained

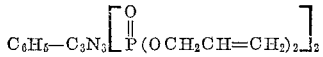

Treatment of this product with ammonia, and aniline according to the procedure of Example VII results respectively in

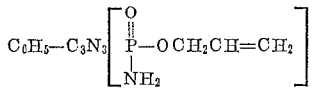

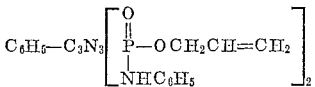

EXAMPLE XIV

One hundred and nine (109) parts of

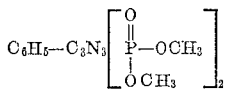

are heated at 100° C. with 300 parts of allylphenol containing 1 part of magnesium oxide for 14 hours or until methanol is no longer released from the reaction. From the reaction product there is obtained

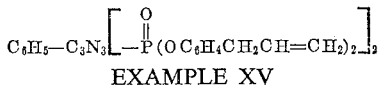

EXAMPLE XV 2,4-di-o-dichlorophenyl-6-chloro-s-triazine is prepared by the method of Chem. Ztg 36, 378 (1912), and when this product is used in the procedures of Examples VII, IX, and XIV, there is obtained respectively

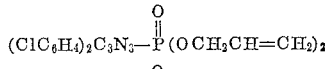

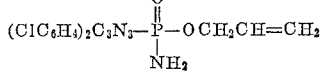

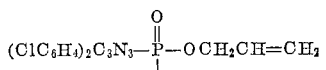

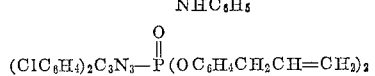

EXAMPLE XVI

Cyanuric chloride is converted to 2-butyl-4,6-dichloro-s-triazine by the method of U.S. Patent 1,911,689, and thereafter converted to 2-butyl-4-chloro-6-thiocarbamyl methyl sulfide, $(C_4H_9)(NH_2OCCH_2S)C_3N_3$—Cl, by the methods given in U.S. Patent 2,295,562.

The reaction of this product according to the procedure of Example II with triallyl phosphite yields the compound

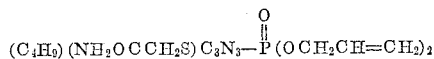

EXAMPLE XVII

Thirty parts of

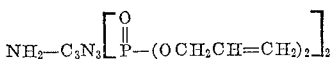

15 parts of 37.1% $CH_2O$ aqueous solution and 0.1 part of NaOH are mixed and allowed to stand 48 hours at room temperature, or until substantially all of the formaldehyde has disappeared and there is obtained a dispersion in water of the compound.

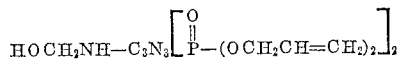

The addition of 4.5 parts of dimethyl amine and 7 parts of diethyl amine respectively, to this compound at room temperature produces, respectively

and

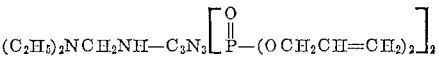

EXAMPLE XVIII

A mixture of 220 parts of

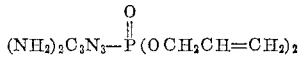

165 parts of 37% formaldehyde aqueous solution, and 3 parts of KOH is allowed to stand at room temperature with constant agitation for 48 hours, at which time substantially all of the formaldehyde has disappeared, and there is obtained a dispersion of the compound

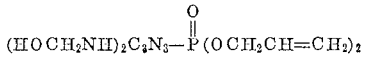

which is dried in a vacuum at room temperature.

EXAMPLE XIX

Two hundred (200) parts of 2,4-di-ethylamino-6-chloro-s-triazine prepared by the method of JACS 73, 2982 (1951) is reacted with 170 parts of triallyl phosphite as in the procedure of Example II, and there is obtained the compound

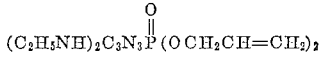

When 203 parts of $P(SCH_2CH=CH_2)_3$ are substituted for the $P(OCH_2CH=CH_2)_3$ of this example the corresponding compound,

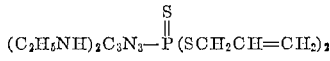

is obtained, which, when reacted with aniline according to the procedure of Example I, affords

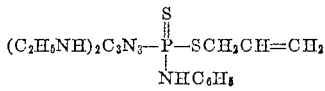

or with p-aminophenol, gives

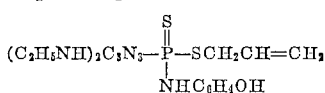

These compounds are found to be suitable as leather tanning agents.

EXAMPLE XX 2-dimethylamino-4,6-dichloro-s-triazine is prepared according to the procedure of JACS 73, 2982 (1951) and converted to the 4-thiocarbamyl methyl sulfide, $(CH_3NH)(NH_2OCCH_2S)C_3N_3Cl$ by the method given in U.S. Patent 2,295,562 and when reacted with triallyl phosphite by the procedures of Example II or Example IX, yields

EXAMPLE XXI 2-chloro-4,6-dimethoxy-s-triazine is prepared according to the procedure of JACS 73, 2989 (1951) and when reacted with one molar equivalent of triallyl phosphite according to the procedure of Example I yields

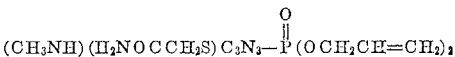

EXAMPLE XXII 2,4-dichloro-6-methoxy-s-triazine is prepared according to the procedure of JACS 73, 2989 (1951) and reacted with two molar equivalents of triallyl phosphite by the procedure of Example I to give

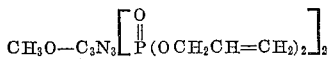

Substitution of 2,4-dichloro-6-phenoxy-s-triazine for the corresponding methoxy derivative in this example produces

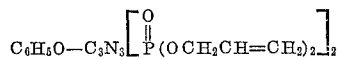

EXAMPLE XXIII

Sulfanilamide is reacted with cyanuric chloride, 2,4-dichloro-6-(4-sulfamoylanilino)-s-triazine according to the method of J. Org. Chem., 24, 643 (1959), and when this compound is reacted with two molar equivalents of triallyl phosphite according to the procedure of Example II, there is obtained the compound

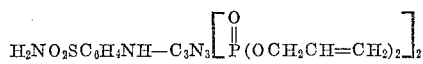

When 2-chloro-4,6-di-(4-sulfamoylanilino)-s-triazine is used instead of the above dichloro-compound with at least one molar equivalent of triallyl phosphite, there is obtained instead

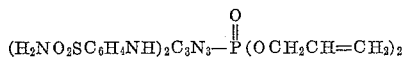

and when 2-amino-4-chloro-6-(4-sulfamoylanilino)-s-triazine is used instead of the dichloro-compound, then, there is obtained

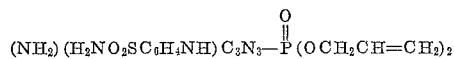

EXAMPLE XXIV 2-ethyl-4,6-dichloro-s-triazine is prepared according to the method of U.S. Patent 1,911,689 and converted by reaction with ethyl amino caproate by the method of U.S. Patent 2,328,961 to

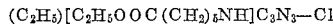

When reacted with one molar equivalent of trimethallyl phosphate by the procedure of Example II produces

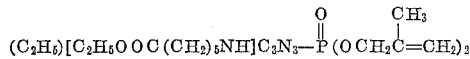

EXAMPLE XXV

Equivalent quantities of 2,4-dichloro-6-(2-hydroxyethylamino)-s-triazine are substituted for the dichloro-triazine of Example XV and there is obtained a good yield of

whereas when the 2-chloro-4,6-di-(2-hydroxyethylamino)-s-triazine is used with one molar equivalent of the phosphite, there is obtained

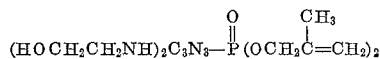

EXAMPLE XXVI 2,4-dichloro-6-(beta-cyanoethyl sulfide)-s-triazine is prepared by the method of U.S. Patent 2,295,561 and is treated with two molar equivalent of triallyl phosphite by the procedure of Example II and there is obtained

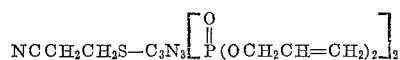

When the above cyanoethyl sulfide derivative is replaced by an equivalent molar quantity of 6-carbanyl-methyl sulfide prepared by the procedure of U.S. Patent 2,295,562, there is obtained

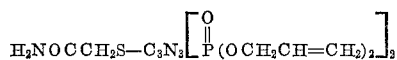

EXAMPLE XXVII 2,4-dichloro-6-semicarcabido-s-triazine is prepared by the method of U.S. Patent 2,295,265 and treated with two molar equivalent of triallyl phosphite according to the procedure of Example II and there is obtained

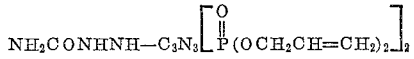

EXAMPLE XXVIII 2,4-dichloro-6-ureido-s-triazine is prepared according to the method of U.S. Patent 2,295,563 and reacted with triallyl phosphite by the procedure of Example II and there is obtained

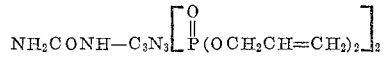

EXAMPLE XXIX 2,4-dichloro-6-(p-sulfamyl-phenyl-carbamyl-methyl sulfide) is prepared according to the method of U.S. Patent 2,316,692 and reacted with triallyl phosphite by the procedure of Example II and then is obtained

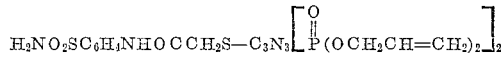

EXAMPLE XXX 2-4-dichloro-6-amino-s-triazine is converted to a mono 2-parahydroxyphenylcarbamyl methyl sulfide by reaction with HSCH$_2$CONHC$_6$H$_4$OH by the procedure of U.S. Patent 2,295,562 and when this product is reacted according to the method of Example II, with triallyl phosphite, there is obtained

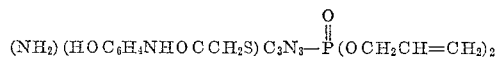

EXAMPLE XXXI

Cyanuric chloride is converted to 2,4-dichloro-6-phenyl-s-triazine by the method of U.S. Patent 1,911,689 and by reaction with para-hydroxy benzamide (by the procedure used for HSCR$_2$CONH$_2$ type compound in U.S. Patent 2,295,562) is converted to

which, when reacted with triallyl phosphite according to the procedure of Example II produces

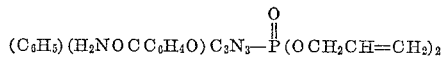

EXAMPLE XXXII 2,4-di-octadecylamino-6-monochloro-s-triazine is prepared by the method given in JACS 73, 2982 (1951) and reacted with a molar equivalent of triallyl phosphite by the procedure of Example II, and the product isolated as

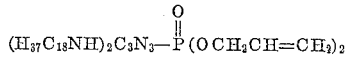

which when saponified by refluxing with one mole methanolic NaOH is converted to

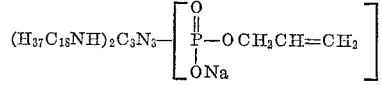

which is water-dispersible and functions as wetting agent, emulsifier and detergent.

When the procedure of this example is repeated using 2,4-dichloro-6-octadecylamino-s-triazine prepared by the method of JACS 73, 2982 (1961) and reacted with two molar equivalent of trimethyl phosphate, there is obtained

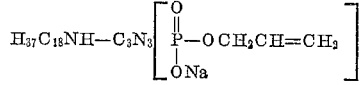

which is a more effective dispersing agent than the mono-compound. This same behavior is observed in the lower alkyl derivatives containing a total of at least 10 carbon atoms in the aliphatic chain, thus

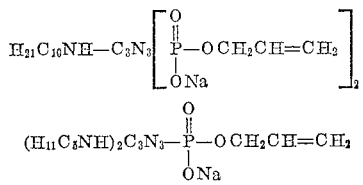

The free acid is readily liberated from these salts by treatment with quantitative amounts of strong inorganic acids such as sulfuric or phosphoric acid. The free acids are useful as rust inhibitors and pickling agents, and have the formula

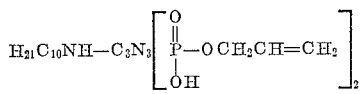

and

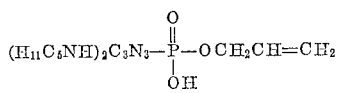

respectively.

Other metal salts such as potassium, lithium, calcium, magnesium, silver, copper, titanium, zirconium, molybdenum, etc., such as those known metals which form both inorganic or organic salts may be prepared by the known metathesis reactions or by treatment of reaction of the oxides or hydroxides of such metals with the free s-triazine phosphonic acids of this invention.

EXAMPLE XXXIII

Cyanuric chloride is converted to 2,4-dimercapto-6-chloro-s-triazine by the method of J. prakt. Chem. (2), 34, 152 (1886), and when this compound is reacted with a molar equivalent of triallyl phosphite according to the procedure of Example II, there is obtained

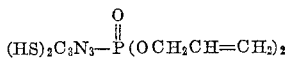

EXAMPLE XXXIV

The procedure of Example I is repeated using molar equivalents of di-vinylphenyl-methyl phosphite instead of triallyl phosphite and there is obtained

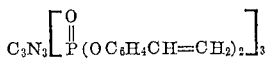

While many of the foregoing examples illustrate the preparation of allyl phosphonium derivatives, various other hydrocarbon phosphites can be used in the preparation of compounds of this invention by using phosphites having in place of the allyl group, various other hydrocarbon radicals with ethylenic unsaturation therein such as, methallyl, crotyl, vinylphenyl, allylphenyl, isopropenyl phenyl, vinylcyclohexenyl, vinylhexamethylene, allylcyclohexyl, etc., each of the foregoing Examples in which allyl phosphite or thiophosphite is used. In each case, the corresponding unsaturated phosphonium triazine derivative is obtained.

Likewise, when mixed phosphites are used, in which different hydrocarbon groups are present in the same phosphonium compound, corresponding mixed phosphonium derivatives are obtained. For example, when diallylpropyl phosphite or allyldipropyl phosphite is used, the resultant triazine phosphonium derivatives have phosphonium groups in which both allyl and propyl groups are present on the phosphonium moiety. Likewise, various other combinations of unsaturated and saturated hydrocarbon groups as indicated above, will give corresponding derivatives.

While the reactions will proceed at temperatures of 50° C. and higher in the various procedures described herein for the preparation of the phosphonium triazine derivatives of this invention, it is generally preferred to use temperatures of at least 80° C.

The following list of radicals illustrates, but is not retricted to, typical Y groups and phosphonium groups that can be present in the compounds of this invention.

| Y Group | Phosphonium Groups |
|---|---|
| $NH_2-$ | $-\overset{O}{\underset{\|}{P}}(OCH_2CH=CH_2)_2$ |
| $HO-$ | |
| $HOC_6H_4NH-$ | $-\overset{O}{\underset{\|}{P}}(OCH_2\underset{CH_3}{\overset{\|}{C}}=CH_2)_2$ |
| $Cl-$ | |
| $C_6H_5-$ | $-\overset{O}{\underset{\|}{P}}(OCHCH=CH_2)_2$ |
| $ClC_6H_4-$ | $\overset{\|}{CH_3}$ |
| $C_4H_9-$ | |
| $HOCH_2NH-$ | $-\overset{S}{\underset{\|}{P}}(SCH_2CH=CH_2)_2$ |
| $-NHC_2H_5$ | |
| $-N(CH_3)_2$ | $-\overset{S}{\underset{\|}{P}}(SCH_2C=CH_2)_2$ |
| $H_2NOCCH_2S-$ | $\overset{\|}{CH_3}$ |
| $CH_3O-$ | |
| $C_6H_5O-$ | $-\overset{O}{\underset{\|}{P}}(OCH=CH_2)_2$ |
| $H_2NO_2SC_6H_4NH-$ | |
| $C_2H_5-$ | $-\overset{O}{\underset{\|}{P}}-OCH_2CH=CH_2$ |
| $H_5C_2OOC(CH_2)_5NH-$ | $\overset{\|}{NHC_6H_5}$ |
| $HOCH_2CH_2NH-$ | |
| $NCCH_2CH_2S-$ | $-\overset{O}{\underset{\|}{P}}(OCH_2\underset{Cl}{\overset{\|}{C}}=CH_2)_2$ |
| $H_2NOCCH_2S-$ | |
| $H_2NCONHNH-$ | |
| $H_2NCONH-$ | $-\overset{O}{\underset{\|}{P}}-OCH_2CH=CH_2$ |
| $H_2NO_2SC_6H_4NHOCCH_2S-$ | $\overset{\|}{NHCH_3}$ |
| $HOC_6H_4NH-$ | |
| $H_{37}C_{18}NH-$ | $-\overset{O}{\underset{\|}{P}}-OCH_2CH=CH_2$ |
| $H_{21}C_{10}NH-$ | $\overset{\|}{N(CH_3)_2}$ |
| $H_{11}C_5NH-$ | |
| $HS-$ | $-\overset{O}{\underset{\|}{P}}-OCH_2CH=CH_2$ |
| | $\overset{\|}{N(C_2H_5)_2}$ |
| | $-\overset{O}{\underset{\|}{P}}-OCH_2CH=CH_2$ |
| | $\overset{\|}{NHC_{10}H_{21}}$ |
| | $-\overset{O}{\underset{\|}{P}}(OC_6H_4CH_2CH=CH_2)_2$ |
| | $-\overset{O}{\underset{\|}{P}}(OC_6H_4CH=CH_2)_2$ |

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims:

The invention claimed is:

1. A symmetrical triazine compound selected from the class consisting of:

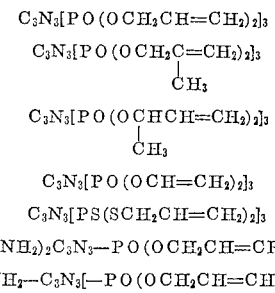

13

NH₂—C₃N₃[—PO(OCH₂CH=CH₂)]₂
         |
         NHC₆H₅

[(C₂H₅)₂N]₂C₃N₃—PO(OCH₂CH=CH₂)

C₆H₅NH—C₃N₃[—PO(OCH₂CH=CH₂)₂]₂

[(C₂H₅)₂N]₂C₃N₃—PO(OCH₂CH=CH₂)
                 |
                 NHC₆H₅

HOC₆H₄NH—C₃N₃[—PO(OCH₂CH=CH₂)₂]₂

(ClC₆H₄NH)₂C₃N₃—PO(OCH₂CH=CH₂)₂ and

HO—C₃N₃PO(OCH₂CH=CH₂)₂
    |
    N(C₄H₉)₂

2. The compound of the formlua

C₃N₃[PO(OCH₂CH=CH₂)₂]₃

3. The compound of the formula

C₃N₃[PO(OCH₂C=CH₂)₂]₃
          |
          CH₃

4. The compound of the formula

C₃N₃[PO(OCHCH=CH₂)₂]₃
        |
        CH₃

5. The compound of the formula

C₃N₃[PO(OCH=CH₂)₂]₃

6. The compound of the formula

C₃N₃[PS(SCH₂CH=CH₂)₂]₃

7. The compound of the formula (NH₂)₂C₃N₃—PO(OCH₂CH=CH₂)₂

8. The compound of the formula

NH₂—C₃N₃[—PO(OCH₂CH=CH₂)₂]₂

9. The compound of the formula

NH₂=C₃N₃[—PO(OCH₂CH=CH₂)]₂
         |
         NHC₆H₅

10. The compound of the formula

[(C₂H₅)₂N]₂C₃N₃—PO(OCH₂CH=CH₂)

11. The compound of the formula

C₆H₅NH—C₃N₃[—PO(OCH₂CH=CH₂)₂]₂

12. The compound of the formula

[(C₂H₅)₂N]₂C₃N₃—PO(OCH₂CH=CH₂)
                 |
                 NHC₆H₅

13. The compound of the formula

HOC₆H₄NH—C₃N₃[—PO(OCH₂CH=CH₂)₂]₂

14. The compound of the formula (ClC₆H₄NH)₂C₃N₃—PO(OCH₂CH=CH₂)₂

15. The compound of the formula

HO—C₃N₃PO(OCH₂CH=CH₂)₂
    |
    N(C₄H₉)₂

References Cited by the Examiner

UNITED STATES PATENTS

| | | | |
|---|---|---|---|
| 2,632,756 | 3/53 | Harman et al. | 260—461 |
| 2,685,581 | 8/54 | Coover | 260—248 |
| 2,706,194 | 4/55 | Morris et al. | 260—461 |
| 2,993,067 | 7/61 | Magerlein et al. | 260—461 |
| 2,993,877 | 7/61 | D'Alelio | 260—249.5 |
| 3,011,998 | 12/61 | D'Alelio | 260—45.2 |
| 3,062,775 | 11/62 | D'Alelio | 260—249.5 |

OTHER REFERENCES

Kosolapoff: "Organo-phosphorus Compounds," Pub. by Wiley and Sons, Inc., N.Y. 1950), pp. 121–122.

IRVING MARCUS, *Primary Examiner.*

WALTER A. MODANCE, *Examiner.*